United States Patent [19]

Hoyle

[11] Patent Number: 4,784,712

[45] Date of Patent: * Nov. 15, 1988

[54] PROCESS FOR SHEET LAMINATION

[76] Inventor: James E. Hoyle, P.O. Box 606, Fillmore, Calif. 93015

[*] Notice: The portion of the term of this patent subsequent to Aug. 27, 2002 has been disclaimed.

[21] Appl. No.: 727,973

[22] Filed: Apr. 26, 1985

Related U.S. Application Data

[62] Division of Ser. No. 503,383, Jun. 10, 1983, Pat. No. 4,537,646.

[51] Int. Cl.$^4$ .......................... B32B 3/04; A47C 27/00
[52] U.S. Cl. ..................................... 156/213; 156/216; 156/223; 5/448
[58] Field of Search ............... 156/202, 212, 213, 216, 156/223, 229, 309.9, 582, 477.1, 220, 219, 275.1, 308.4; 5/448, 453, 450, 473, 474; 425/500, 521, 508

[56] References Cited

U.S. PATENT DOCUMENTS

| | | | |
|---|---|---|---|
| 3,270,394 | 9/1966 | Marsh et al. | 156/220 |
| 3,466,214 | 9/1969 | Polk et al. | 156/275.1 |
| 3,520,755 | 7/1970 | Scholl et al. | 156/223 |
| 3,580,770 | 5/1971 | Dyal | 156/479 |
| 3,730,798 | 5/1973 | Franz | 156/202 |
| 3,874,276 | 4/1975 | Froehlig | 156/216 |
| 3,888,613 | 6/1975 | Fries et al. | 156/216 |
| 3,995,984 | 12/1976 | Fetherston et al. | 425/521 |
| 4,295,235 | 10/1981 | Deitz | 156/308.4 |
| 4,310,365 | 1/1982 | Elliott et al. | 156/582 |
| 4,334,947 | 6/1982 | Zaino | 156/216 |
| 4,537,646 | 8/1985 | Hoyle | 156/212 |

Primary Examiner—Michael Ball
Assistant Examiner—Louis Falasco
Attorney, Agent, or Firm—Jessup, Beecher & Slehofer

[57] ABSTRACT

Process for forming and securing a polymeric sheet onto a planer board, process for making a lap desk, a die apparatus used in the process, and the laminated board product. The process includes the steps of gluing an oversize sheet onto the board and drawing the board through a heated die to bend the edges of the sheet onto the periphery of the board. The lap desk is formed by gluing a bag to the periphery of the board, filling the bag with stuffing, and drawing the sheet, board and stuffed bag through the die to laminate the sheet to the board. The die apparatus includes a frame to hold the assembly as it is drawn through the die, and a press for pushing the assembly through the die.

12 Claims, 3 Drawing Sheets

PROCESS FOR SHEET LAMINATION

This is a division of patent application Ser. No. 503,383 filed June 10, 1983, now U.S. Pat. No. 4,537,646, dated Aug. 27, 1985.

SUMMARY OF THE INVENTION

The purpose of the present invention is to provide a laminated board lap desk having a bag filled with stuffing material located under and attached to the edges of the board, and to disclose the process by which a thermoplastic sheet is laminated to a planar board, thus forming the laminated board. The die apparatus used in the laminating process is also part of the invention. The end product, the laminated board lap desk finds use as a portable desk wherever a traditional desk is unavailable, such as on an airplane, train, bus, or the like. The lap desk is placed on the lap of the user, and the stuffing material spreads out to provide a support base for the board. The board provides a writing surface or a book prop for the convenience of the user, and is also useful as a game board, or snack tray.

The die apparatus is a hollow rectangular shaped die having a center area, or die passage, open for allowing the board assembly to be drawn through it. The upper part of the interior opening or die passage has four heating rods, one for each side. Each heating element has its own thermostat for accurately controlling the amount of heat transmitted to the periphery of the board as it is being drawn through the die passage. The lower portion of the die is a water jacket for cooling the heated periphery of the board. The interior sides of the die, which is the die passage, have slightly tapered or wedge shaped cross-sections for narrowing the opening of the die passage, as the board assembly is drawn through the passage. The purpose of this tapering allows the lip-overhang of the board assembly to gradually bend upwards as it is heated and drawn through the passage.

The first item that is placed into the die passage is a frame means, or grid, which consists of an integral rectangular frame with cross wires. On all four sides of the framework are located pressure bars biased outwardly by compression springs. The frame is wedged into the opening of the die near the heating elements. The pressure bars press outwardly against the sides of the frame and the frame is therefore held in place in the die passage. The face of the lap assembly and other sheets are then placed upon this frame. A hydraulic press drives the assembly-frame through the die passage at a controlled rate.

The frame can slide through the passage because of the resilience of the springs, which compress as the frame is being wedged into the die passage. Another purpose of the frame is to transmit heat from the heating element to the periphery of the laminated board assembly and also to assist in cooling the board after it has been heated.

The overall configuration of the surface of the planar board is generally rectangular with rounded corners. The laminating process to be described is especially suitable wherever the overall board configuration is non-linear such as a circular, eliptical, semi-circular, horseshoe shaped or the like. The process could be adapted for laminating a like-shaped thermoplastic sheet to one of the aforementioned board shapes. The die passage would be fabricated to conform to the board's overall planar surface shape. Accordingly, it is to be understood that the steps described in fabricating the lap desk apply to the fabrication of other board shapes, where the periphery of the board, or planar surface shape is at least parti ally non-linear, or completey non-linear.

To fabricate the lap desk, one first starts with a flat rectangular board of polystyrene foam or other suitable material having a 1 inch hole. The size of the board is generally 15½×13×⅜ inches thick and has rounded corners which is an accept able size for a lap desk. The next piece of material required is a rectangular sheet of polymeric thermoplastic resin having a rectangular shape of 16×13½ inches with rounded corners. This provides for a ¼ inch overhang or extension over the board after the two pieces are centered and glued together.

In constructing the lap desk, a bag is first glued around the edges of the board, i.e., the edges of the bag are secured to the edges of the board. Stuffing material, such as polystyrene foam beads are then inserted through the hole in the board. Enough material is used to create a cushion effect, and still allow for the free shifting of the material to fill in the uneven con tours of the user's lap. The sheet and face of the board are then sprayed with a contact adhesive and allowed to set for a few minutes. Afterwards the sheet is placed in a jig and the board bag is placed face to face with the sheet. This provides for the centering of the board on the sheet. The assembly is put in a press to assure firm contact between the sheet and the board. After the adhesive has set, the assembly is ready for the forming process. If the centering process was done correctly, there will be a peripheral extension, or overhang of the sheet, so that after this overhang is formed down against the edge of and adjacent to the edge of the board, it will give a finished look to the lamination without the necessity of trimming away any material after the lamination is complete, and it will also cover the raw edge of the bag.

The steps in laminating the polymeric sheet to the polystyrene plastic foam board will now be described. The die passage in the die is slightly larger than the size of the board to allow for the assembly to be drawn through the passage. As already discussed when describing the die apparatus, the frame means or grid is already wedged in the upper part of the die passage, and the heating elements have already been heated to their working temperatures, and the cooling water is flowing in the water jacket. The release sheet and the rubber sheet should be described at this point. The elastomeric sheet is 0.06" thick and has overall dimensions larger than the polymeric sheet, and it is positioned on top of the frame means grid. The purpose of this rubber sheet is to stretch over the polymeric sheet as the assembly is drawn through the die passage. The sheet presses the edges and top of the polymeric sheet against the board, and it also modifies the amount of heat transmitted to the polymeric sheet. This results in a smoother folding of the sheet over and against the edge of the board. The release sheet is then placed over the rubber sheet and is of about the same dimensions as the rubber sheet. The purpose of the release sheet is to cling to the polymeric sheet as it is drawn through the die passage and to remain on the assembly until it is peeled off at a later time. The release sheet serves to protect the assembly from marring and scratching until such time as the lap desk is ready for further processing. It also prevents the elastomeric (rubber) sheet from stretching the edges of the thermoplastic sheet unevenly since the release sheet does not stretch with the rubber sheet and so acts as a buffer between the rubber sheet and the thermoplastic sheet.

After the frame means, elastomeric sheet, and release sheet are in position on the die, the lap desk assembly is placed face down on top of the release sheet. An open-sided box is placed over the desk assembly. The outer dimensions of the open side are the same or slightly smaller than the dimensions of the planar board. The purpose of this box is to transmit pressure evenly around the edges of the assembly as it is being drawn through the die passage.

The hydraulic press is then brought to bear on the face of the pressure box, and the process of pushing the assembly through the die passage is begun. The frame means prevents the elastomeric sheet and the release sheet from falling through the passage. As the assembly is drawn through the narrowing of the die passage, the heat from the heating elements is transferred to the peripheral edges of the polymeric sheet, causing the resin to soften and become pliant. The edges of the polymeric sheet eventually are bent against and adjacent to the edge of the planar board, because of the narrowing or wedge effect of the die passage. The cooling water jacket rigidifies the configuration of the sheet against the board while the assembly is still in the die. The peripheral portion of the sheet is bent around the edges and corner of the planar board.

As the pressing continues, the frame means eventually exits from the underside of the die. It falls onto a ramp and is put to one side. Thereafter the elastomeric sheet, the release sheet, and the desk assembly drop out of the bottom of the press. The rubber sheet is removed and is ready for reuse while the release sheet remains with the assembly until such time as it is removed. The release sheet is then discarded.

The present invention involves relatively few steps in the process, thus simplifying the machinery and handling required. It nonetheless effects lamination and bending of a sheet over the edge of a relatively stiff board, completely around the periphery of the board, and including all of the corners, all in what is essentailly a single maneuver.

It is one object of the present invention to provide a process for securing a polymeric sheet onto and around the edges of a planar board, the periphery of the board having at least one non-linear portion.

Another object of the present invention is to provide a process for making a laminated board lap desk.

Still another object of the present invention is to provide a die apparatus for forming a polymeric sheet around the edges of a planar board.

Yet another object of the present invention is to provide a laminated board having a flat board and a polymeric sheet laminated one to another, the polymeric sheet formed to cover the edges of the board.

Yet another object of the present invention is to provide a lap board having a laminated board polymeric sheet and a substantially full bag attached to the other side, the polymeric sheet formed to cover and secure the edge of the bag to the edge of the board.

Other objects, advantages and novel features of the invention will become apparent from the following detailed description of the invention, in conjunction with the drawings, wherein like parts are identified by like numbers throughout.

DETAILED DESCRIPTION OF THE PREFERRED EMBODIMENT

Figure 1:
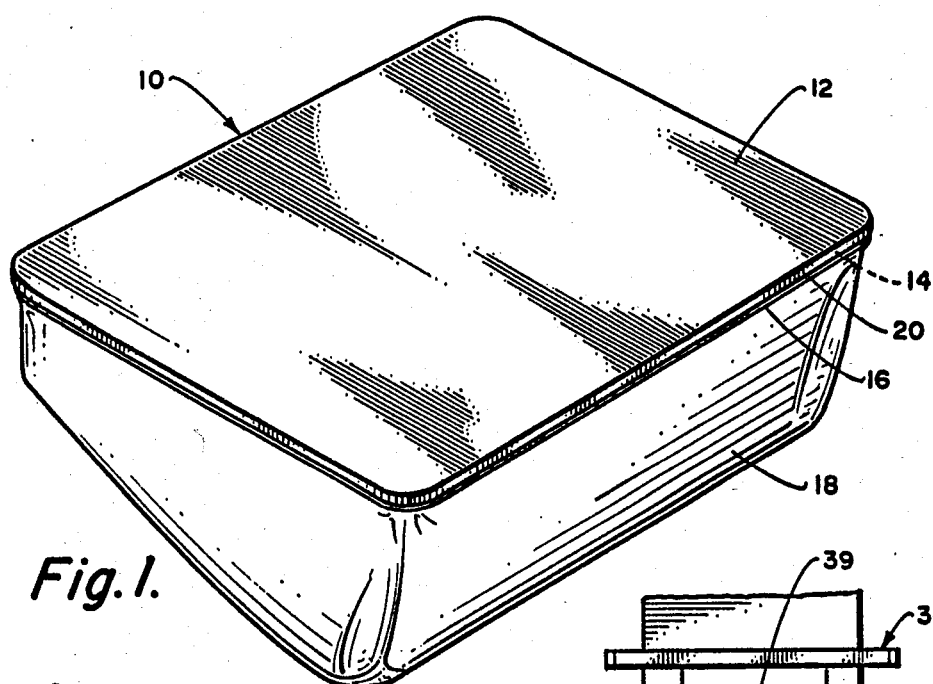
FIG. 1 is a perspective view of a lap desk with the laminated sheet and planar board attached to the bag.

A lap desk assembly according to the invention is illustrated in FIG. 1. In this figure, the lap desk 10 is comprised of a polymeric sheet 12, that has been laminated to a planar board 14. It cannot be seen in this figure because the peripheral portion, or overhang 16 of the sheet 12 has been bent down to cover the thickness of the board 14. The sheet 12 and board 14 have been laminated against each other and the sheet 12 is contiguous to the face of the board 14. The sheet 12 is described as a polymeric sheet having a thermoplastic resin composition. This means that the sheet becomes pliable and bendable after the application of the heat to it. Attached to the underside of the board 14 is the filled bag 18 which serves as a cushion between the lap of the user and the desk top. The edge of the bag 18 is attached around to the edges of the board 14. Inside of this bag is inserted stuffing material to substantially fill the space created when the empty bag 18 was first secured to the edge of the board 14.

For the purposes of the construction of the lap desk 10, a piece of polystyrene foam rigid planar board material 14 is molded to the proper dimensions. The overall dimensions are 15½×13×⅜ inches with rounded corners. A one inch hole is molded in the surface of the board 14 for allowing for a filler spout through which the stuffing material can be inserted. The next step in fabricating a lap desk is to take the bag 18 and to glue the edges of it to the edges of the board 14 so that the vertical edges of the board are secured to the edges of the bag. After this step has taken place the stuffing material such as polystyrene foam beads are inserted into the space in the bag by introducing the stuffing material through the one inch circular hole in the board 14. The polymeric sheet 12 is cut from a larger sheet of thermoplastic resin to the following dimensions 16×13½×0.03 inches. These dimensions are to allow roughly a ¼ inch peripheral overhang around the entire circumference of the polystyrene foam board 14. The polymeric sheet 12 is attached to the board 14 by the application of adhesive to both faces. The adhesive is allowed to set for a few minutes until it becomes tacky. Thereafter the sheet 12 is placed in a jig which is used in centering the board-bag assembly 14 onto the sheet 12 and then the assembly is pressed together to complete the gluing operation. This way there is a uniform, peripheral overhang 16. The thickness of the plastic sheet 12 is roughly 0.030 inches, and the thickness of the underlying planar board 14 is approximately ⅜ inch.

Figures 2, 3:
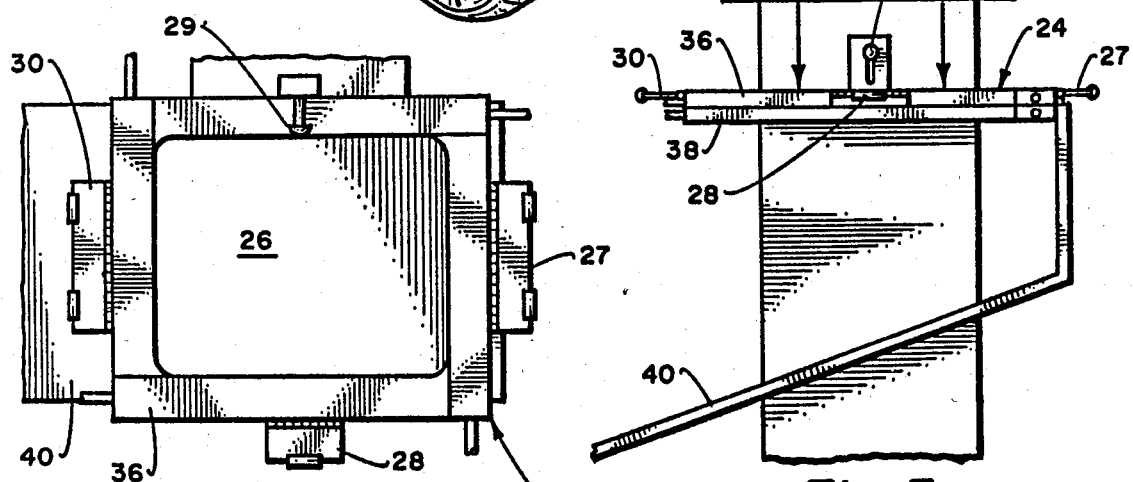
FIG. 2 is a top plan view of the die apparatus showing the die passage through which the lap desk assembly is drawn, and the hinge locks being swung out of the way.
FIG. 3 is a front elevational view of the die apparatus showing the frame assembly above the surface of the die, and the arrows indicating the correct positioning of the frame into the die passage.
Figure 11:
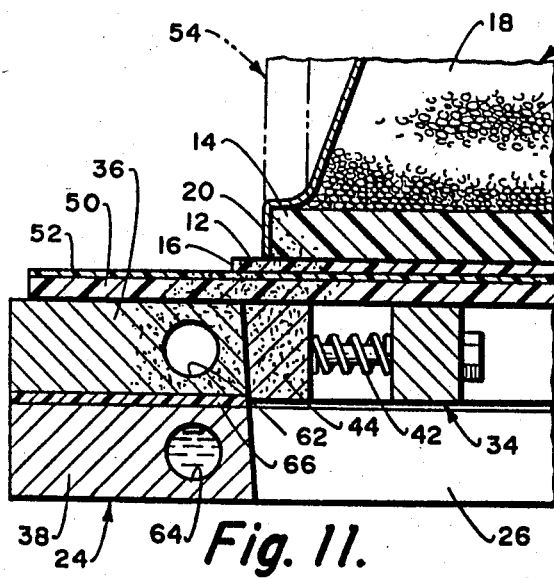
FIG. 11 is a partial cross-sectional view taken along the lines 11—11 of FIG. 8 showing how the frame assembly is initially wedged in the die passage and further showing the rubber sheet, the release sheet, and the lap desk assembly resting on top of the frame assembly.

The die apparatus according to the invention is illustrated in FIG. 2. In this FIG. showing a top plan view of the die 26. The die passage 26 tapers inwards as one goes from the top to the bottom of the die. FIG. 11 shows the tapering of the die passage. Around the outside die apparatus 24 are three hinge locks 27, 28 and 30 which will be referred to when discussing the process of centering the desk assembly 10 over the die passage 26. Stay 29 also assists in centering the assembly.

FIG. 3 shows an elevational view of the die 24, the arrows indicate that the frame assembly 34 is placed downward on a path normal to the plane of the frame assembly 34. As can be seen in FIG. 3 there are two parts to the forming die 24. They are the heating section 36 and the cooling section 38. Attached at one edge of the cooling section 38 is a sloping ramp 40.

Figure 4:
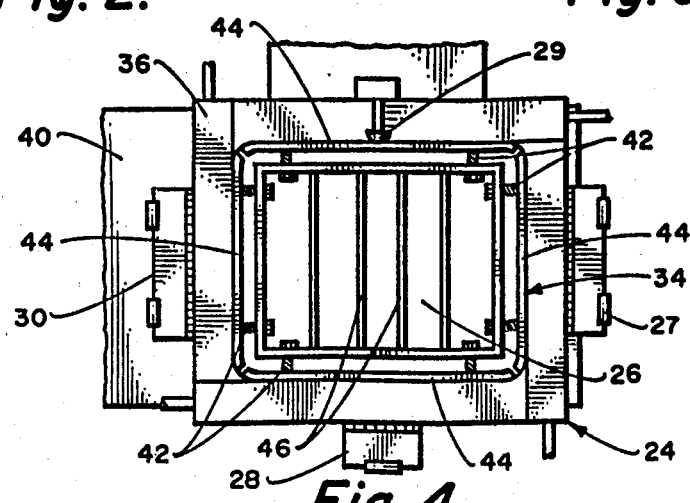
FIG. 4 is the top plan view of FIG. 2 showing the frame assembly in place in the die passage.

FIG. 4 shows the frame assembly 34 inserted into the top of the die passage 26. The frame assembly 34 is further comprised of cross wires 46 which are used in supporting the lap assembly 10 as everything is drawn through the die passage 26. Included with this frame assembly 34 are pressure bars 44 and having a spring bias 42 at each contact of the bars 44 to the frame assembly. Each pressure bar 44 is spring-pressed outwardly to frictionally engage the tapered sides of the die passage 26 of the die apparatus 24. The spring 42 of each of the pressure bars 44 allow for the pressure bars 44 to be pushed towards the sides of the die passage as the frame assembly 34 passes through the narrowing of the die passage 26. The pressure bars 44 also serve to transmit heat from the heating portion 36 of the die 24. Pressure bars 44 extend into the rounded corners leaving only a small gap so the heat transfer is substantially the same in the corners as on the straight edges.

Figure 5:
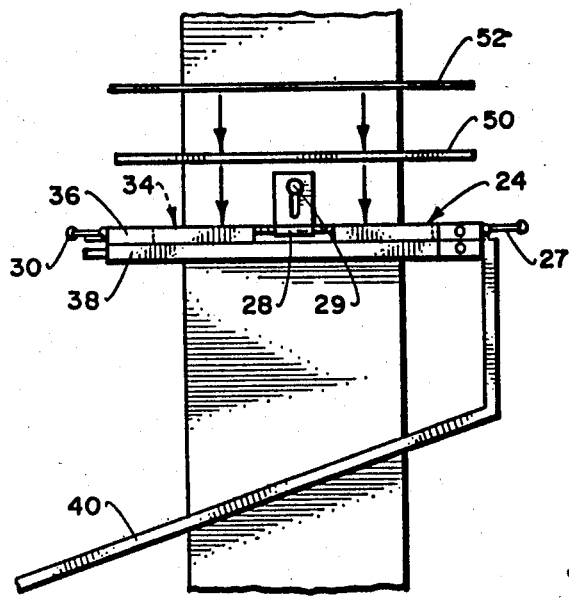
FIG. 5 is a front elevational view of the die apparatus with the frame assembly already in place as shown in FIG. 4, and further showing by means of arrows the placement of the elastomeric sheet on top of the frame assembly and the release sheet on top of the elastomeric sheet.

The process of laminating the sheet 12 to the board 14 consists of passing the combination 10 through the die passage 26 which slightly larger overall dimensions than those of the board 14. The wedging effect causes the peripheral portion 16 to bend back approximately 90° against the edges of board 14 and to maintain that configuration after the complete assembly 10 has been drawn through the die passage. To smooth out the edge forming of the sheet, particularly at the four corners, an elastomeric sheet (FIG. 5) made of silicone rubber, or the like is placed directly above the frame assembly 34. The overall dimensions of the sheet 50 are 15×18×0.06 inches, about two inches larger than the overall dimensions of the die passage 26. A layer above this elastomeric sheet 50 is another sheet 52 referred to as a release sheet. The release sheet has a thickness of 0.001 inches and has the overall dimensions of 15×18 inches. The release sheet 52 has the function of not only preventing sticking to the elastomeric sheet 50, but it also acts as a buffer during the operation so that the edge 16 of the polymeric sheet 12 is evenly formed in a straight line along the edge 15 of the board 14. The release sheet 52 also insulates the elastomeric sheet 50 from any overflow adhesive that might ooze out around the edge of the polymeric sheet 12.

The rubber sheet 50 can be successfully made of various gradations and variations of silicone. There are also other non-silicone elastomers which work as well without the added expense of using the more expensive silicone sheet.

Figure 6:
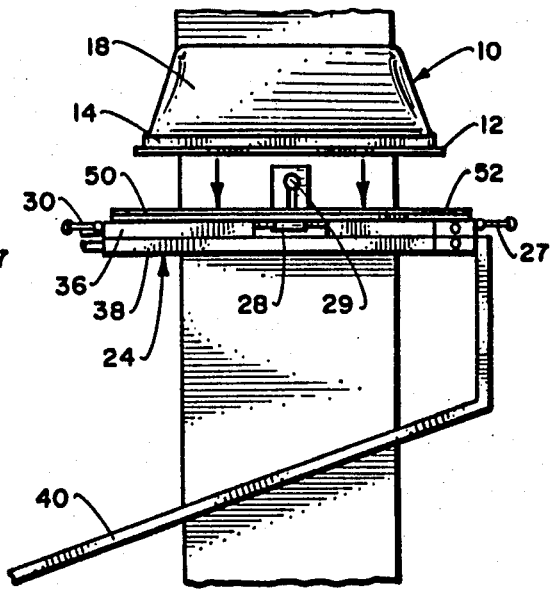
FIG. 6 shows the next step after FIG. 5 wherein the lap desk assembly is placed face down on top of the release sheet.

FIGS. 5 through 10 illustrate the successive steps used in practicing the process of laminating and forming the sheet 12 to the board 14. As graphically shown in FIG. 4, the frame assembly 34 is already in place in FIG. 5. The elastomeric sheet 50 is placed over the frame assembly and the release sheet 52 is placed on top of the elastomeric sheet 50. In FIG. 6 the lap desk assembly 10 is then placed face down on top of the release sheet 52.

Figure 7:
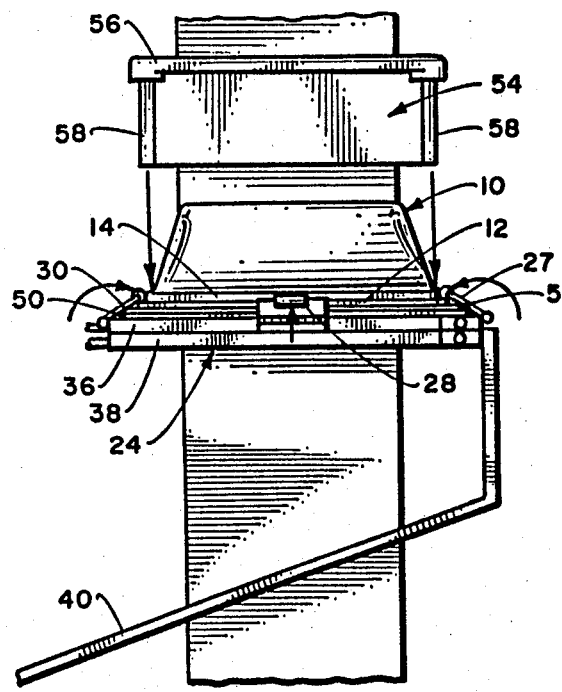
FIG. 7 shows the next step after FIG. 6 where an open ended box is placed over the lap desk assembly and indicating that the hinge locating plates are in position to center the lap desk assembly over the die passage.
Figure 8:
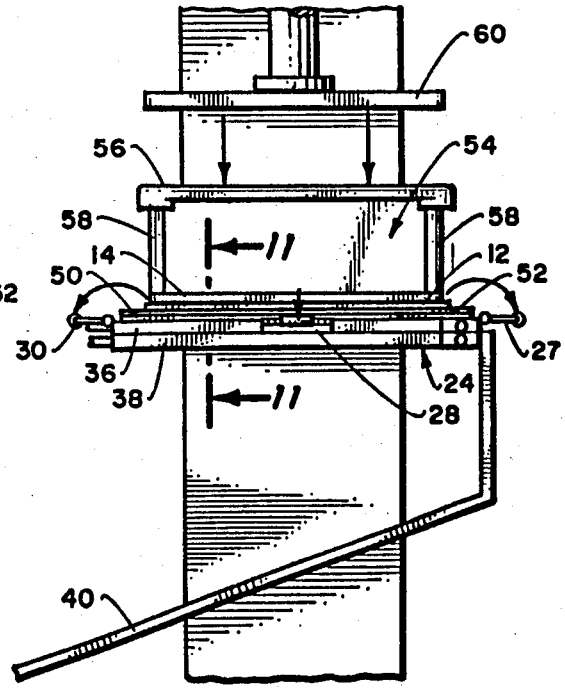
FIG. 8 is the next step after FIG. 7 showing the hinge locating plates swung back, the open-ended box pressed in place over the lap desk assembly and showing the hydraulic press coming down to press against the top of the open-ended box press.
Figure 9:
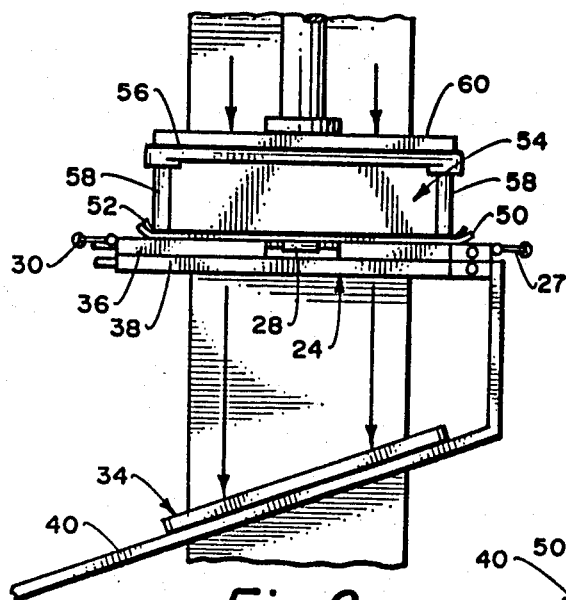
FIG. 9 is the next step after FIG. 8 showing the hydraulic press pressing down on the assembly forcing it to be drawn through the die passage of the die and further showing where the frame assembly has dropped out of the bottom of the die passage and onto the ramp.
Figure 10:
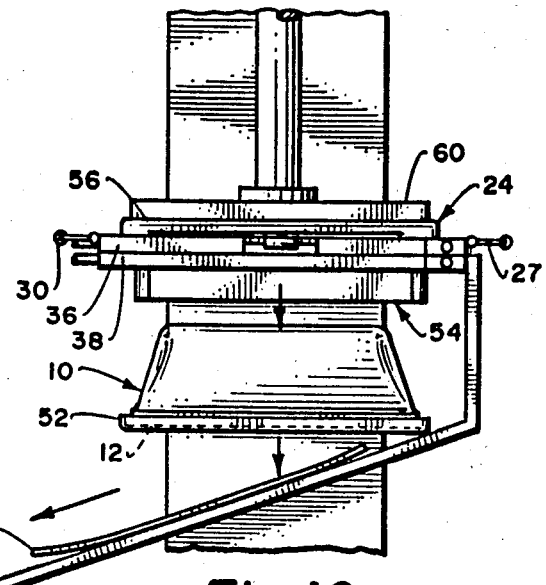
FIG. 10 shows where the hydraulic press has drawn or pushed the assembly and sheets through the die passage, the elastomeric sheet is lying on the ramp, the release sheet is stuck to the polymeric sheet surface and the top edges of the box are hanging on the edges of the die passage.

FIG. 7 illustrates the means for centering the lap assembly 10 above the die passage 26. The hinge locks 27, 28 and 30 are pivoted forward into place to center the lap assembly 10 correctly over the die 24. FIG. 7 also illustrates the box press 54 above the lap desk assembly 10. The arrows indicate that the box 54 is positioned above the perimeter of the board 14. The perimeter edges of the box 54 rests on top the shelf next to the edges of the board 14, that is, the overall dimensions of the box 54 do not exceed the overall dimensions of the board 14. This limitation is necessary because both have to be small enough to pass through the die passage 26. Further, the box press 54 has an overhang 56 which stops the box from passing through the die passage. The walls 58 of the box 54 are of sufficient length to press the assembly 10 completely through the die 24. FIG. 8 illustrates the hydraulic press 60 coming down in a plane normal to the plane of the lap desk assembly 10. The hinges 27, 28 and 30 are pivoted back and away so that the box 54 can be pressed against the edge of the assembly 10. FIG. 9 shows the hydraulic press 60, or drive means, pressing down on the box 54. During this procedure the heating elements are heating the peripheral portion 16 of the polymeric sheet 12 so that it can be formed in the upper section 36 of die 24 and as it is passing through the lower section 38 of the die 24, the cooling section 38 is rigidifying the bent peripheral overhang. FIG. 10 illustrates the completion of the process. The assembly 10 drops out of the bottom of the die passage 26 and falls onto a ramp 40. The rubber or elastomeric sheet 50 falls away from the polymeric sheet 12. The release sheet 52 clings to the polymeric sheet 12 and remains so until it is removed for further processing. The process illustrated in FIG. 5 through 10 could be used to form and laminate the polymeric board 12 to the stiff board 14 without the filled bag 18 attached to the back of the rigid board 14. The laminated board assembly 10 could find use in a variety of other applications than for use in a lap desk. FIGS. 5 through 10 simply illustrate the process used when fabricating a laminated lap desk.

Figure 12:
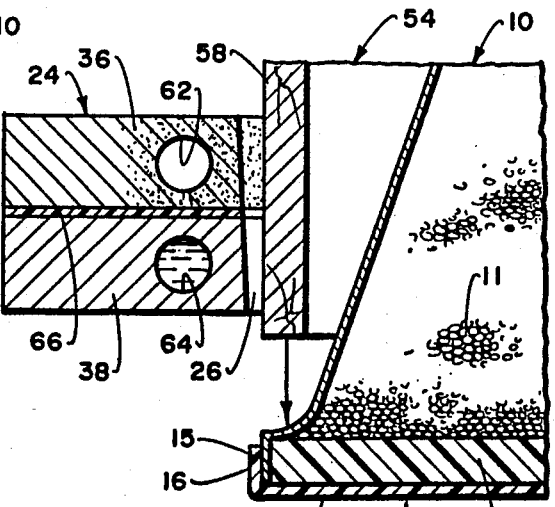
FIG. 12 shows the partial cross-sectional view of the next succeeding step as the box press is pressing the assembly and sheets through the die passage. It illustrates where the heating elements are transferring heat and bending the peripheral portion of the polymeric sheet to the edge of the planar board.
Figure 12:
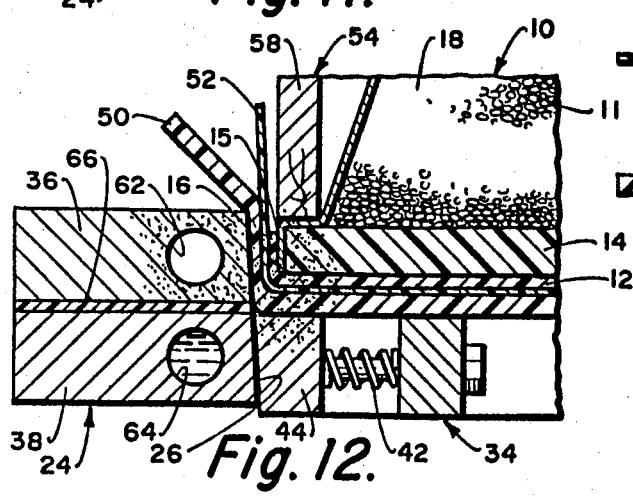
Figure 13:
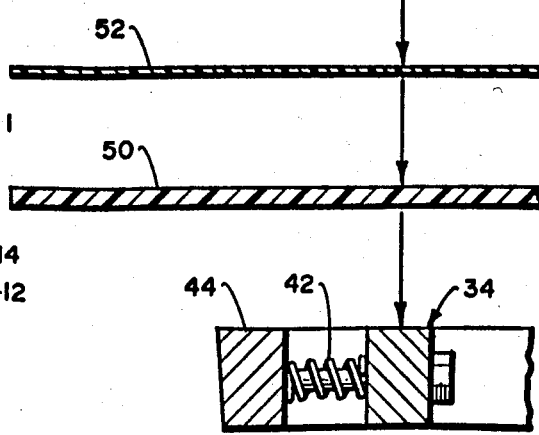
FIG. 13 is a partial cross-sectional view showing the separation of the frame assembly, the rubber sheet, the release sheet and the completed laminated lap desk after it has been pressed through the die passage.

FIG. 11, 12 and 13 are cross-sectional views showing in greater detail the steps and the changes which occur as the assembly 10 is drawn through the die 24.

FIG. 11 is the cross-sectional view taken along the lines 11—11 in FIG. 8. There is disclosed a cross-section of the die 24 further having two halves. The upper half 36 contains the heating element 62 which is controlled by its own thermostat (not shown) Each face in the die passage has its own heating element 62 and its respective thermostat to adjust for the correct amount of heat to be applied to the assembly 10. The lower half of the die 24 is the cooling section 38. There is disclosed a port 64 for circulating cold water. There is a teflon gasket disclosed at 66 which separates the two sections 36 and 38 and act as an insulator. The pressure bar 44 of the frame assembly 34 has a cross-sectional wedge-like configuration for full surface contact against the inside walls of the die 24. A spring 42 keeps an outward pressure causing the pressure bar 44 to press against the walls The frame assembly 34 has a pressure bar against each of the four walls of the die 24. The purpose of these pressure bars 44 is to provide a movable base as the frame assembly 10 is drawn through the die passage 26 and to conduct heat from the heating elements 62 to the polymeric sheet 12 and its peripheral section 16. The frame assembly 34 acts as a brake to prevent the sheets 50 and 52 from falling through the die passage 26 too rapidly. FIG. 11 corresponds to the resting position just before the press box 54 is placed upon the assembly as shown in FIG. 8.

FIG. 12 illustrates the position of the assembly 10 after the heating step has already taken place. The assembly has been registered with the die and heated. The tapering or wedged shape of the die passage 26 is clearly shown in FIG. 12. The bending of the peripheral portion 16 is illustrated. The side 58 of the box 54 is shown pressing on the perimeter of the rigid board 14. The sheet 12, being comprised of a thermo-plastic polymeric resin, becomes pliant and bendable upon the application of heat from the heating element 62. As illustrated in FIG. 12, the peripheral portion 16 has been bent approximately 90° so that it is over and adjacent to the edge 15 of the board 14. As previously stated, the elastomeric sheet 50 is sufficiently of an overall dimension to cover the sheet 12 and also to protect the edges from direct contact with the heating section 36. The sheet 50 also serves to effect a smoother forming of the sheet 12 over and against the edge 15 of the board 14.

The frame means or frame assembly 34 is frictionally held against the die passage 26. FIG. 13 and FIG. 9 illustrate that the assembly 34 emerges first through the die 24. The path of the assembly 10 through the die is normal to the plane of the board 14. The die passage 26 is slightly larger than the planer periphery of the board 14. This in turn causes the die to bend and form the peripheral portion 16 of the sheet 12 over and adjacent to the edge 15 of the board 14. The bag 18 and the stuffing material is illustrated in FIG. 12. The bag 18 is flexible and is secured by its edges around the edges 15 of the board 14. The stuffing material 11 has substantially filled the volume between the bag 18 and the board 14. Also shown in FIG. 12 is that the sheet of polymeric resin 12 is contiguous to the external face of the board 14. As illustrated here in FIG. 12, the peripheral portion 16 is approximately the same thickness as the thickness of the edge 15 of the board. This overhang is limited so that the peripheral portion 16 does not extend substantially beyond the thickness of the board 14.

FIG. 13 shows the cross-sectional view of FIG. 10 after the process of heating and forming and cooling the peripheral portion has been completed. The cooling section 38 of the die 24 has rigidified the configuration of the sheet 12 against the board 14 as the assembly passed through the lower portion of the die 24. FIG. 13 shows the serial emergence of the components used in the process. The frame assembly 34 exits first; then the rubber assembly exits, and for the purposes of illustration only, the release sheet 52 is shown separated from the surface of the polymeric sheet 12. As stated before, however, this release sheet 52 clings to the surface of the assembly until such time as it is removed for further processing. The hydraulic press 60 and the open-ended box 54 are the drive means for moving the sheet 12 and board 14 through the die passage 26 on a path normal to the plane of the board 14.

The lap desk shown is rectangular with rounded corners. The process forms the peripheral portions around the corners as well as on the straight portions. This process is suitable for almost any shape board, even one with compound curves both inward and outward defining its perimeter or periphery. The board may be of any desired shape, having both outside corners as in the present example, and also inside corners such as would be encountered in a horseshoe-shaped artist's pallet.

Obviously, many modifications and variations of the present invention are possible in light of the above teachings. It is therefore to be understood that the full scope of the invention is not limited to the details disclosed herein, but may be practiced otherwise than as specifically described.

What is claimed is:

1. Process for forming and laminating a polymeric sheet, having a peripheral portion and an edge, onto a planar board having an edge, comprising:
    creating an assembly by placing the sheet against the board with the edge of the sheet extending beyond the edge of the board;
    heating the peripheral portion of the sheet to render the sheet formable and bendable over the edge of the board around the periphery of the board;
    moving the assembly on a path normal to the plane of the assembly in a given direction through a substantially rigid forming die having a die passage slightly larger than the planar periphery of the board;

causing the die to bend and form the peripheral portion of the sheet over and adjacent the edge of the board around the periphery of the board;

completing the drawing of the assembly through the die and expelling the assembly from the die in said given direction.

2. Process in accordance with claim 1, including:

contacting the assembly, prior to moving the assembly through the die, with a frame held frictionally in said passage; flowing heat from the edge of the die passage into the frame, and thence into the assembly adjacent the edge of the board;

moving the assembly through the die passage while pushing the frame ahead, until both frame and assembly emerge from the outlet of the die passage.

3. Process in accordance with claim 1, wherein:

the sheet is made of thermoplastic resin.

4. Process in accordance with claim 1, wherein:

said placing of the sheet against the board includes applying an adhesive between sheet and board to hold the sheet in position against the board as the assembly is registered with the die and heated.

5. Process in accordance with claim 1, including:

interposing an elastomeric sheet between the assembly and the die passage, thereby to effect a smoother folding of the sheet over and against the edge of the board.

6. Process in accordance with claim 5, including:

interposing a release sheet between the assembly and the elastomeric sheet.

7. Process in accordance with claim 1, including:

rigidifying the configuration of the sheet against the edge of the board by cooling the sheet while the assembly is still in the die, 8. Process in accordance with claim 1, including:

heating the die passage: flowing heat from the die passage into the peripheral portion of the sheet while moving the assembly through the die.

9. Process in accordance with claim 1 including:

contacting the assembly, prior to moving the assembly through the die, with a frame held frictionally in said passage;

flowing heat from the edge of the die passage into the frame, and thence into the assembly adjacent the edge of the board.

10. Process in accordance with claim 1 including:

contacting the assembly, prior to moving the assembly through the die, with a frame held frictionally in said passage;

moving the assembly through the die passage while pushing the frame ahead, until both frame and assembly emerge from the outlet of the die passage.

11. Process in accordance with claim 2, including:

interposing an elastomeric sheet between the assembly and the frame and die passage, thereby to effect a smoother folding of the sheet over and against the edge of the board.

12. Process in accordance with claim 11, including:

interposing a release sheet between the assembly and the elastomeric sheet.

* * * * *